US007211287B2

(12) United States Patent  (10) Patent No.: US 7,211,287 B2
Efstathiou et al.  (45) Date of Patent: May 1, 2007

(54) EGG PRODUCTS

(75) Inventors: John D. Efstathiou, Plymouth, MN (US); Laura Huston, St. Cloud, MN (US); Jill M. Morriss, Big Lake, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 10/876,365

(22) Filed: Jun. 24, 2004

(65) Prior Publication Data

US 2005/0287260 A1   Dec. 29, 2005

(51) Int. Cl.
*A23L 1/32* (2006.01)
(52) U.S. Cl. .................. 426/614; 426/521; 426/407; 426/392
(58) Field of Classification Search .............. 426/614, 426/521, 407, 392
See application file for complete search history.

(56) References Cited

U.S. PATENT DOCUMENTS

| | | | |
|---|---|---|---|
| 4,695,472 A * | 9/1987 | Dunn et al. ............. 426/237 |
| 4,808,425 A | 2/1989 | Swartzel et al. |
| 4,957,759 A | 9/1990 | Swartzel et al. |
| 4,994,291 A | 2/1991 | Swartzel et al. |
| 5,019,408 A | 5/1991 | Swartzel et al. |
| 5,105,724 A | 4/1992 | Swartzel et al. |
| 5,316,745 A | 5/1994 | Ting et al. |
| 5,612,076 A * | 3/1997 | Samimi et al. .......... 426/234 |
| 5,620,735 A | 4/1997 | Manderfeld et al. |
| 5,665,416 A | 9/1997 | Manderfeld et al. |
| 5,670,199 A | 9/1997 | Swartzel et al. |
| 5,741,539 A * | 4/1998 | Knipper et al. ......... 426/614 |
| 5,891,505 A | 4/1999 | Schuman et al. |
| 5,932,813 A | 8/1999 | Swartzel et al. |
| 6,015,231 A | 1/2000 | Swartzel et al. |
| 6,090,425 A * | 7/2000 | Samimi .................. 426/399 |
| 6,120,732 A * | 9/2000 | Toledo et al. .......... 422/39 |
| 6,177,115 B1 * | 1/2001 | Meyer .................... 426/521 |
| RE37,225 E | 6/2001 | Swartzel et al. |
| 6,305,913 B1 | 10/2001 | Hashish et al. |
| 6,403,141 B1 | 6/2002 | Liot |
| 6,406,727 B1 | 6/2002 | Hamid-Samimi et al. |
| 6,524,638 B2 | 2/2003 | Knipper et al. |
| 6,536,947 B1 | 3/2003 | Swartzel et al. |
| 6,784,405 B2 * | 8/2004 | Flugstad et al. ........ 219/497 |
| 6,799,467 B2 * | 10/2004 | Minerich et al. ........ 73/700 |
| 6,824,801 B2 * | 11/2004 | Yajima et al. .......... 426/326 |
| 2003/0012859 A1 | 1/2003 | Efstathiou |
| 2003/0035752 A1 * | 2/2003 | Aksenov et al. ........ 422/26 |
| 2003/0091711 A1 | 5/2003 | Sanderson et al. |
| 2003/0219525 A1 | 11/2003 | Woodward et al. |
| 2004/0076733 A1 | 4/2004 | Sanderson et al. |

FOREIGN PATENT DOCUMENTS

| | | |
|---|---|---|
| DE | 44 15 751 A1 | 5/1995 |
| GB | 2283900 A | 5/1995 |
| WO | WO 89/12399 A1 | 12/1989 |
| WO | WO 94/18845 A1 | 9/1994 |
| WO | WO 95/08275 A1 | 3/1995 |
| WO | WO 95/26636 A1 | 10/1995 |

OTHER PUBLICATIONS

Alvarez et al. Inactivation of *Salmonella enterica* Serovar Enteritidis by Ultrasonic Waves under Pressure at Different Water Activities. Applied and Environmental Microbiology, Jan. 2003. vol. 69, No. 1.*
Knorr et al., "Applications and potential of ultrasonics in food processing", *Trends in Food Science & Technology*, vol. 15, May 2004 (pp. 261-266).
Lee, Dong-Un, "Application of combined non-thermal treatments for the processing of liquid whole egg", available at least as of Sep. 9, 2002 (109 pgs.).
Lee et al., "Biphasic Inactivation Kinetics of *Escherichia coli* in Liquid Whole Egg by High Hydrostatic Pressure Treatments", *Department of Food Biotechnology and Food Process Engineering*, vol. 17, No. 6, 2001 (pp. 1020-1025).
Lee et al., "High Pressure Treatment of Liquid Whole Egg and Advantages of Low Temperature Application", *High Pressure Research*, vol. 19, 2000, (pp. 131-136).
Lee et al., "Evaluation of Processing Criteria for the High Pressure Treatment of Liquid Whole Egg: Rheological Study", *Department of Food Biotechnology and Food Process Engineering*, accepted May 7, 1999 (6 pgs.).
Ibarz et al., "Viscoelastic Properties of Egg Gels Formed with High Hydrostatic Pressure", *Institute of Food Technologists, Annual Meeting Presentation*, 1996 (pp. 57-72, XP008054241).
JP 6-54672, "High-Pressure Sterilization of Food", Mar. 1, 1994 (Abstract only, 1 pg.).
JP 4-141068, "Production of Egg White Composition", May 14, 1992 (Abstract only, 1 pg.).
Lee et al., "Effects of combination treatments of nisin and high-intensity ultrasound with high pressure on the microbial inactivation in liquid whole egg", *Innovative Food Science and Emerging Technologies*, vol. 4, No. 4, 2003 (pp. 387-393 XP008054174).
PCT Notification of Transmittal of the International Search Report and the Written Opinion of the International Searching Authority, or the Declaration, based on International Application No. PCT/US2005/021760, date of mailing Nov. 3, 2005 (9 pgs.).
PCT International Search Report based on International Application No. PCT/US2005/021760, date of mailing of the International Search Report Nov. 3, 2005 (6 pgs.).

(Continued)

*Primary Examiner*—Anthony Weier
(74) *Attorney, Agent, or Firm*—Foley & Lardner LLP

(57) ABSTRACT

Presented herein are methods of treating egg products to increase shelf life, which include treating the egg products with high pressure. In addition, the egg products may be pasteurized before, during, or after the pressure-treatment. Optionally, the egg products may include one or more antimicrobial agents and/or acidifying agents. The method may be useful for producing a packaged egg product that has an extended shelf life as determined by bacteria population density in the product and/or organoleptic properties.

27 Claims, 1 Drawing Sheet

OTHER PUBLICATIONS

"Combined effect of nisin and high hydrostatic pressure on destruction of *Listeria innocua* and *Escherichia coli* in liquid whole egg"; E. Ponce, R. Pia, E. Sendra, B. Guamis, M. Mor-Mur; *International Journal of Food Microbiology,* 43; (1998); pp. 15-19.

"Inactivation of *Listeria innocua* Inoculated in Liquid Whole Egg by High Hydrostatic Pressure"; E. Ponce, R. Pla*, M. Mor-Mur, R. Gervilla, B. Guamis; *Journal of Food Protection,* vol. 61, No. 1, 1998, pp. 119-122.

"Fresher Under Pressure"; Fresher Under Pressure Guided Tour; Avure Technologies; printed from www.avure.com/gtour1.htm on Feb. 13, 2004; 9 pgs.

"Fresher Under Pressure"; Fresher Under Pressure Equipment; Avure Technologies; printed from www.avure.com/equipment.htm on Feb. 13, 2004; 3 pgs.

"Liquid Egg Products"; The Nisaplin® Advantage; Aplin & Barrett Ltd.; 1 pg., published at least by Jun. 1, 2004.

"The Relationship Between Nisaplin® and Pure Nisin"; The Nisaplin® Advantage; Aplin & Barrett Ltd.; 1 pg., published at least by Jun. 1, 2004.

"Fresher Under Pressure"; Fresher Under Pressure Food Safety; Avure Technologies, printed from www.avure.com/safety.htm on Feb. 13, 2004; 3 pgs.

"Fresher Under Pressure" Fresher Under Pressure Scientific Research; "High Pressure Processing of Foods: An Overview"; (First Published in Science Des Aliments, 19 (1999) P619-661); G. Tewari*, D.S. Jayas[(1)], R. A. Holley [(2)]; printed from www.fresherunderpressure.com/science_hpp_review.htm on Feb. 12, 2004.

*Journal of Agricultural and Food Chemistry;* vol. 47; Sep. 1999; No. 9; Published by the American Chemical Society; 8 pgs.

*Food Microbiology;* Jun. 1998; vol. 15, No. 3; ISSN 0740-0020; Academic Press; 10 pgs.

* cited by examiner

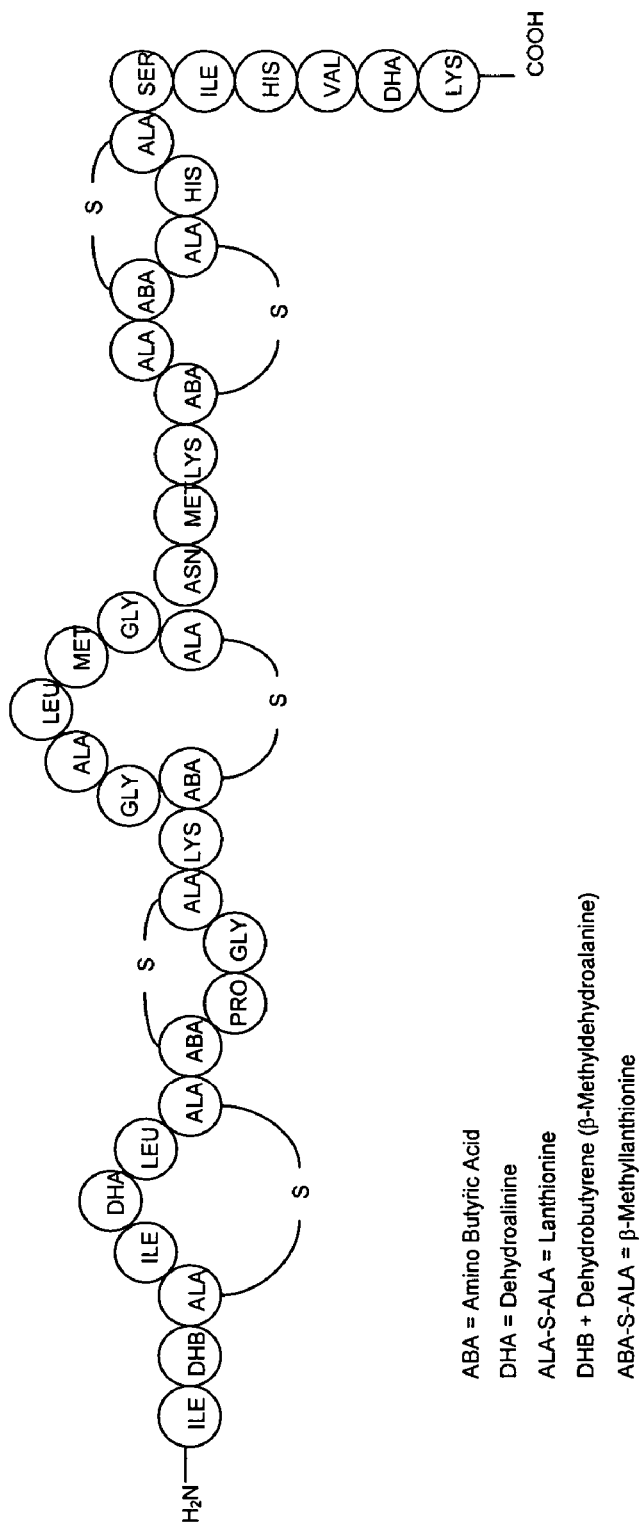
Figure 1. Amino Acid Sequence of Nisin

EGG PRODUCTS

BACKGROUND

For suppliers of egg products, it is desirable to extend the shelf life of an egg product, such that the purchaser can store the product for several weeks and reliably use the product without the product having developed unacceptable levels of harmful microbes or undesirable taste and/or flavor properties during storage, (e.g., rotten smell or sour taste).

Egg products intended for consumption are often stored and/or treated by one or more methods in order to increase the shelf life of the egg product. For example, egg products are typically stored at about 4° C. to hinder the growth of microbes, which typically grow best at higher temperatures. By storing the egg product at cool temperatures, the shelf life of the egg product can be extended for several weeks. The shelf life of the stored egg product is typically assessed by determining the concentration of bacteria in the product and subsequently evaluating organoleptic properties of the product.

In addition, the egg product may also be treated by one or more methods to decrease or eliminate harmful microbes from the egg product before storage. In particular, the egg products may be pasteurized (e.g., heat-treated). Pasteurization will also essentially eliminate the number of harmful microbes (e.g., *Salmonella* and/or *Listeria*) in the egg product by several log orders, such that the product is safe to consume. Pasteurization will also reduce the number of bacteria detrimental to the quality of the egg product by several log orders. As such, the time period for these microbes to reach unacceptable levels in the egg product is extended. Electromagnetic radiation may also be used to reduce or eliminate the number of harmful microbes present in the egg product. For example, the egg product may be treated with radio waves and/or gamma irradiation. These methods of pasteurization may be useful in extending the shelf life of processed egg products by several weeks.

Anti-microbial agents may also be used to extend the shelf life of egg products. For example, anti-microbial agents can extend the shelf life of egg products by killing microbes (i.e., cidal agents) or by keeping microbes from growing (i.e., static agents).

However, present commercial methods of storing and/or treating egg products only increase the shelf life of the product by several weeks. For suppliers and users of egg products, a method of further extending the shelf life of egg products is desirable.

SUMMARY

Described herein is a method for extending the shelf life of egg products. In one embodiment, the method includes pasteurizing egg material; treating the pasteurized egg material with pressure; and optionally adding a food grade anti-microbial agent to the egg material. The antimicrobial agent may be added prior to, simultaneously with the pasteurization step and/or after pasteurization has been carried out. In another embodiment, the method includes treating pasteurized egg material with pressure. Typically, the egg material is treated with pressure of at least about 300 MPa (~45,000 psi). As with the first embodiment, the pasteurized egg material may include a food grade microbial agent, such as nisin.

The egg material may be pasteurized by any suitable means. For example, the egg material may be pasteurized by heat treating the egg material to temperatures about 60° C. (~140° F.) to about 65° C. (~150° F.). In some instances, the egg material is treated in a manner sufficient to pasteurize the material without coagulating the egg. For other products, it may be desirable to cook the egg material with pasteurization occurring as part of the cooking. In other embodiments, the egg material may be pasteurized by exposing the egg material to electromagnetic radiation, such as infrared or gamma irradiation or high frequency radiowaves.

The egg material may be pasteurized by processes other than heating the egg material. For example, the egg material may be pasteurized by exposing the egg material to electromagnetic radiation or high frequency radiowaves.

Before or after pasteurization, a suitable antimicrobial agent may be added to the egg material. Nisin is one example of a suitable antimicrobial agent.

Other agents may be added to the egg material before or after pasteurization. For example, acidifying agents may be added to the egg material. In particular, citric acid may be added to the egg material as an acidifying agent.

The egg material may be pressure-treated during or after pasteurization by first enclosing the egg material in a sealed package and then treating the packaged material with pressure (e.g., hydrostatic pressure). The packaged material is typically treated with pressure for about 1 to about 5 minutes. During pressure treatment, the packaged material may be maintained at a selected temperature, (e.g., about 4° C. (~40° F.) to about 65° C. (~150° F.)). In one embodiment, the packaged material and packaging material are heated during pressure treatment to simultaneously pressure-treat and heat-pasteurize the packaged material.

The egg material may be liquid egg material, which may be concentrated liquid egg material. The liquid egg material may be whole egg material, egg yolk material or egg white material. Alternatively, the egg material may be cooked (e.g., after pasteurization).

Also disclosed are products produced by the aforementioned methods. For example, the methods may be used to produce a processed liquid egg product, which may be a whole egg product, an egg yolk product, an egg white product, and/or a concentrated egg product. Typically, the processed liquid egg product is produced by treating a pasteurized egg product with pressure at least about 300 MPa (~45,000 psi). The product may include an antimicrobial agent (e.g., about 50 to 1000 ppm nisin).

The aforementioned methods may also be used to produce a processed egg product by treating cooked egg material with a pressure. Typically, the cooked egg material is treated with pressure of at least about 300 MPa (~45,000 psi).

Often, it may be convenient to pressure-treat a pasteurized egg product that is already packaged. The packaged product may include liquid egg material and/or cooked egg material which is contained within a sealed package, and the egg material may include about 50 to 1000 ppm nisin. The liquid egg material typically has a viscosity of no more than about 5000 cps. The packaged processed egg product typically retains acceptable organoleptic properties (e.g., appearance, odor, and taste), and has a total bacterial plate count of no more than about 100 microorganism/gram after having been stored for at least 15 weeks at 4° C.

Disclosed is a packaged processed egg product comprising: liquid egg material contained within a sealed package; wherein the liquid egg material has a viscosity of no more than about 5000 cps; and includes about 50 to 1000 ppm nisin; and the packaged processed egg product is capable of being stored for at least 15 weeks at 40° C. to provide a stored product, such that the stored product retains acceptable organoleptic properties and has a total bacterial plate count of no more than about 100 bacteria per gram product; and optionally wherein the stored product has a psychotrophic microorganism plate count of no more than about 100 bacteria per gram product. Also disclosed is a packaged processed egg product comprising: cooked egg material, which includes about 50 to 1000 ppm nisin, contained within a sealed package; wherein the packaged processed egg product is capable of being stored for at least 15 weeks at 40° C. to provide a stored product, such that the stored product retains acceptable organoleptic properties and has a total bacterial plate count of no more than about 100 bacteria per gram product; and optionally wherein the stored product has a psychotrophic microorganism plate count of no more than about 100 bacteria per gram product. Also disclosed is a packaged processed egg product comprising: cooked egg material, which includes about 50 to 1000 ppm nisin, contained within a sealed package; wherein the packaged processed egg product is capable of being stored for at least 15 weeks at 40° C. to provide a stored product, such that the stored product retains acceptable organoleptic properties and has a psychotrophic microorganism plate count of no more than about 100 bacteria per gram product.

Definitions

"Liquid whole egg" means a mixture of egg white and yolk. The liquid whole egg may, but does not necessarily, include egg white and egg yolk in a ratio recognized as the ratio of yolk to white in egg shells. Liquid whole egg products may include other "additives" such as salts or buffers (e.g., sodium chloride, sodium acid pyrophosphate (SAPP), monosodium phosphate (MSP), monosodium glutamate (MSG)), sugar, nisin, starch (e.g., cornstarch), xanthan gum, and acidifying agents (e.g., citric acid).

"Liquid egg white" means egg white obtained after separating the white and the yolk by breaking fresh eggs, and as such, the liquid egg white is substantially free of egg yolk. The liquid egg white may be used in products that include other "additives" as describe above.

"Liquid egg yolk" means egg yolk obtained after separating the yolk and the white by breaking fresh eggs, and as such, the liquid egg yolk is substantially free of egg white. The liquid egg yolk may be used in other products that include other "additives" as described above.

"Egg material" means liquid or cooked "whole egg," "egg whites," or "egg yolks." "Egg material" may be used in products that include other "additives" as describe above.

"Antimicrobial agents" means cidal agents (i.e., agents that kill microbes) and static agents (i.e., agents that retard the growth of microbes). "Microbes" means bacteria, fungi, viruses, prions, protozoa or any other microscopic organism that is capable of spoiling food and/or causing illness. Antimicrobial agents may include bacteriocidal and bacteriostatic agents. Bacteriocidal agents include bacteriocins (e.g., nisin). "Bacteriocins" are bacteriocidal agents produced by bacteria.

"Food grade" means that up to specified amount of the specified agent (e.g., an antimicrobial agent that includes a single compound or a mixture of compounds) can be ingested by a human without generally causing deleterious health effects. Examples of food grade agents include those additives "generally recognized as safe" ("GRAS") by the United States Food and Drug Administration ("FDA") and colorants approved by the FDA for use in foods for human consumption. In particular, food grade additives includes those compounds (or mixtures of compounds) listed as approved under 21 C.F.R. §§ 73, 74, 172, 182 and 184 as well as other compounds recognized by comparable regulatory authorities in other countries.

DRAWINGS

FIG. 1 shows the amino acid sequence for Nisin.

DETAILED DESCRIPTION OF THE PREFERRED EMBODIMENTS

The present method relates to extending the shelf life of processed egg products. The shelf life of egg products is generally limited by the growth of harmful and/or spoiling microbes, which are detrimental to the quality of the product.

Egg products may contain low numbers of several species of bacteria, which may be present in the eggs as initially obtained from chickens or which may be introduced during processing of the eggs to produce an egg product. Harmful and/or spoiling bacteria may include *Listeria* spp. (such as *Listeria monocytogenes*) and *Salmonella* spp. Spoiling bacteria may include *Pseudomonas* spp., and/or *Streptococcus* spp. (such as *Streptococcus faecalis*). During prolonged storage of an egg product, spoiling bacteria may grow to unacceptable levels.

The number of *Listeria* spp. in the egg product may be determined by inoculating samples of the egg product on selective media and determining the number of colony forming units (CFU)/gram product (i.e., plate counts/gram product). Selective media for growing *Listeria* spp. may include Oxford Media, Modified Oxford Media, Palcam Media, Aloa Media, Fraser Broth, and Lithium Chloride Ceftaxidine Media (LCA). *Listeria* spp. may be grown by adding a *Listeria* spp. selective supplement (e.g., Nalidixic acid (40.0 mg/L), Cycloheximide (50.0 mg/L), and Acriflavine hydrochloride (15.0 mg/L), to a base broth (e.g., Tryptone soya broth (30 g/L), Yeast extract (6 g/L), Potassium di-hydrogen orthophosphate (1.35 g/L), Disodium hydrogen orthophosphate (9.6 g/L), final pH 7.3±0.2).

Similarly, the number of *Salmonella* spp. in the egg product may be determined by using selective media. Selective media for growing *Salmonella* spp. may include Xylose Lysine Decarboxylase Media, Kliger Iron Media, Rappaport and Vassiliadis Soya Media, Lysin Iron Media, Lysin Decarboxylase Media, Rambach Media, Simmons Citrate Media, Triple Sugar Iron Media, Hectoen Enteric Media, and Bismuth Sulphite Media. In addition, *Salmonella* spp. may be grown in enrichment media that may include Selenite Cystine Broth and Tetrathionate Broth.

The shelf life of the egg product may be determined by removing a sample of the product after storage and performing various microbiological assays to count the number of bacteria in the product. For example, general assays, such as total plate counts (TPC) assays (i.e., aerobic plate counts), may be used to count the total number of bacteria in the sample as determined by growth on general TPC media (i.e., CFU or plate count per gram product). General TPC media may include any medium that allows for growth of aerobic bacteria without selectivity (e.g., a medium that includes tryptone, yeast extract, and dextrose). General TPC media and/or agar plates are available from commercial sources. Total plate count assays may be performed by inoculating a general TPC medium with a sample and incubating the inoculated medium at 37° C. (~100° F. for approximately two (2) days (i.e., forty-eight (48) hours±three (3) hours). Shelf life may be determined by estimating the bacterial population density in the egg product (e.g., number of bacteria per gram product) after storage. A general rule in the food industry is that shelf life ends when the plate count exceeds about $10^7$ organisms per gram egg product.

Psychotrophic plate count assays are also a useful indicator of a product's suitability for consumption. Psychotrophic bacteria are bacteria that have a maximum growth rate between 4° C. and 20° C. (between ~40° F. and ~70° F.). Psychotrophic plate count assays may be performed by inoculating a general TPC medium with a sample and incubating the inoculated medium at 20° C. (~70° F.) for approximately three (3) days (i.e., seventy-two (72) hours±three (3) hours).

*Pseudomonas* plate count assays are another useful indicator of a product's suitability for consumption. *Pseudomonas* plate count assays utilize *Pseudomonas* selective media which may be prepared by adding several antibiotics (i.e., cetrimide, fucidin, and cephalosporin) to a media base, which may include gelatin peptone, casein hydrolysate, potassium sulphate, and magnesium chloride. *Pseudomonas* spp. are resistant to the antibiotics present in the selective media. *Pseudomonas* plate count assays may be performed by inoculating a *Pseudomonas* selective medium with a sample and incubating the inoculated medium at 20° C. (~70° F.) for approximately three (3) days (i.e., seventy-two (72) hours±three (3) hours).

In many instances, the shelf life of a particualr egg product may be set based on a combination of factors related not only to the maintenance of bacterial/microbial counts below a low threshold, but also retention of acceptable organoleptic properties. For example, after performing microbiological assays to determine the number of bacteria per gram egg product, the organoleptic properties of the egg product may be assessed. Organoleptic properties include appearance, odor, and taste. To assess organoleptic properties, the egg product is prepared and periodically examined for changes in appearance, aroma, texture and taste until it becomes unacceptable. An organoleptic determination is easily accomplished by those familiar with the egg product's desired characteristics. The organoleptic quality of an egg product changes as its microflora, including bacteria, grow and metabolize available nutrients. Changes in organoleptic properties might be subtle until microbial growth reaches a high level, which makes the food unacceptable.

The shelf life of egg products may be extended by various means. For example, because most bacteria grow best at temperatures around 37° C. (~98° F.), egg products are stored at lower temperatures (e.g., 4° C. (~40° F.)). At lower temperatures, the growth of most bacteria in the egg product is retarded, such that it takes longer for the bacteria to reach unacceptable levels and for the egg product to lose desirable organoleptic properties.

Pressure treatment has also been shown to be effective at reducing the amount of bacteria within egg products. The egg product may be pressure-treated in addition to being pasteurized, (e.g., before, during, or after pasteurization). For example, egg products may be exposed to pressures of at least about 300–600 MPa (~45,000–90,000 psi) and commonly no greater than about 700 MPa (~100,000 psi). Generally, the egg product is pressure-treated for at least about one (1) minute (i.e., the "hold time"), and commonly about two (2) to about (3) minutes.

The efficiency of pasteurization is proportional to the time that the egg product is exposed to heat and/or pressure. Where an egg product is exposed to both heat and pressure, it may be possible to reduce the time required to effectively pasteurize the egg product. As such, it may be desirable to maintain the egg product at a particular temperature while it is being pressure-treated. For example, it may be desirable to maintain the egg product at a temperature of about 50° C. (~120° F.) to about 65° C. (~150° F.). In such a case, the egg product may be simultaneously pasteurized and pressure-treated without coagulating the product. Alternatively, the egg product may be heated during pressure-treatment to a temperature sufficient to cook the product, (e.g., at a temperature of about 75° C. (~170° F.) or higher).

High pressure processing typically involves placing the egg product into a sealable package (e.g., a plastic bag) and sealing the bag such that no leakage occurs during the forthcoming pressure treatment. The sealed package may include a "head space" (e.g., about 10% of the volume of the container). The head space may include air or the head space may be filled with a gas such as nitrogen, carbon dioxide, or both. After the product is placed in the sealed package, the packaged product can be exposed to hydrostatic pressure, commonly of at least about 300 MPa (~45,000 psi), e.g., at about 580 MPa (~87,000 psi) for about two (2) to about (3) minutes. Typically, the packaged product is exposed to hydrostatic pressure by placing the packaged product in a high-pressure vessel and filling the vessel with a high-pressure fluid (e.g., water). After the packaged product is exposed to hydrostatic pressure for a suitable time period, the packaged product is removed from the vessel and stored at a suitable temperature, (e.g., at about 4° C. (~40° F.)).

The shelf life may also be extended by reducing the number of microbes initially in the product prior to storage. For example, the egg product may be pasteurized to reduce the number of viable microbes initially present in the food product. Pasteurization may be accomplished by several means including heat treatment. For example, temperatures of about 50° C. (~120° F.) to about 65° C. (~150° F.) are effective at pasteurizing egg material. At higher temperatures, (i.e., greater than about 65° C. (~150° F.), the egg product begins to cook, such that higher temperatures may be used to simultaneously pasteurize and cook the egg product. A typical pasteurizing/cooking temperature may be about 75° C. (~170° F.) to about 95° C. (~200° F.).

Typically, the egg product is maintained at the pasteurization temperature for a period of time called the "hold time." An effective hold time may be about one (1) minute, and more commonly at least about two (2) to about four (4) minutes.

Other methods of pasteurization are also effective for reducing the number of bacteria in an egg product prior to storage. For example, the egg product may be exposed to electromagnetic radiation. Gamma irradiation, electron beam particles, and/or high frequency radio waves (e.g., about 500 Kilohertz to about 500 Megahertz) can be used to pasteurize the egg product.

Effective pasteurization is typically determined by a reduction in the number of bacteria present in the sample, before and after pasteurization. A five (5) log cycle reduction in the number of *Listeria* spp. and a seven (7) log cycle reduction in the number of *Salmonella* spp., is indicative of effective pasteurization. However, larger reductions, (e.g., a seven (7) log cycle reduction in the number of *Listeria* spp. and a nine (9) log cycle reduction in the number of *Salmonella* spp.), may be desirable.

In addition to pasteurization, antimicrobial agents may be added to the egg product before or after pasteurization to extend shelf life. Antimicrobial agents may be used to kill organisms in the product (i.e., cidal agents) or to retard the growth of organisms in the product (i.e., static agents). The antimicrobial agent added to the egg product is typically food grade material.

One particularly suitable antimicrobial agent is nisin, which is a bacteriocin produced by *Lactococcus lactis* subsp. *lactis*. Nisin consists of a short peptide (34 a.a.) that includes atypical amino acids. The amino acid sequence of Nisin is displayed in FIG. 1.

Nisin may be added to the egg product in any effective concentration to extend the shelf life of the egg product. For example, suitable concentrations may be about 50 to about 1000 ppm; about 100 ppm to about 500 ppm; and about 150 ppm to about 350 ppm.

A variety of egg products may be suitable for the aforementioned methods of extending shelf life. For example, liquid egg products, such as liquid whole eggs, liquid egg whites, liquid egg yolks, and mixtures thereof, and/or concentrated liquid egg products may be suitable for the methods. The liquid egg products may include additional ingredients such as salts and/or buffers (e.g., sodium chloride, SAPP, MSP, and/or MSG), water, thickening agents (e.g., xanthan gum, carrageenan), milk products (e.g., butter milk and/or nonfat milk), edible oils (e.g., soybean oil), flavors (e.g., butter, pepper, egg, and/or MSG), acidifying agents (e.g., citric acid to achieve a pH of about 6.7 to about 6.8), chelating agents (e.g., EDTA), and antimicrobial agents (e.g., Nisin). The mixtures in the illustrated embodiments and examples described below exemplify suitable liquid egg products, which, in addition, may be treated with heat to provide suitable cooked products for the aforementioned methods of extending shelf life.

Illustrated Embodiments

In one embodiment of the disclosed methods, egg material is first pasteurized. A food grade anti-microbial agent may be added to the egg material (e.g., before or after pasteurization). After the egg material has been pasteurized, the pasteurized egg material may be sealed in a package or container (e.g., a plastic bag) and treated with pressure of at least about 300 MPa (~45,000 psi) for about 2–3 minutes. In one embodiment, the packaged egg material is treated with hydrostatic pressure. The packaged egg material may be pressure-treated at a temperature of about 4° C. (~40° F.) to 65° C. (~150° F.).

In one embodiment of the disclosed method, the egg material includes nisin as an antimicrobial agent. Nisin may be present in any suitable amount from about 50 to about 1000 ppm.

It may be desirable to heat-pasteurize the egg material and pressure-treat the egg material simultaneously. For example, the egg material may be heated to about 65° C. (~150° F.) and simultaneously treated with pressure of at least about 300 MPa (~45,000) for about 2–3 minutes.

The egg material may include other agents such as acidifying agents. Acidifying agents may be added to the egg material before or after pasteurization. In one embodiment, the acidifying agent is citric acid.

In another embodiment, pasteurized egg material is treated with pressure of at least about 300 MPa (~45,000 psi). The pasteurized egg material may include antimicrobial agents (e.g., nisin at about 50–1000 ppm) and/or acidifying agents (e.g., citric acid). The acidifying agent may be used to adjust the pH of the egg material from about 5.5–6.9. In some embodiments, the acidifying agent may be used to adjust the pH to about 6.5–6.8.

In a further embodiment, a processed egg product is produced by treating pasteurized egg material with a pressure of at least about 300 MPa (~45,000 psi). The processed liquid egg product may include a food grade antimicrobial agent such as nisin at a concentration of about 50–1000 ppm. The egg product may be liquid (e.g., concentrated whole eggs) and/or solid (e.g., cooked eggs).

The processed egg product may include a simulated egg patty produced by (1) freezing egg yolk material; (2) combining the frozen egg yolk material and liquid egg white material to form a combined egg material; and (3) cooking the combined egg material to produce a simulated egg patty. The egg yolk material and/or liquid egg white material may include an antimicrobial agent (e.g., nisin at 50–1000 ppm). The simulated egg patty may be pressure-treated by sealing the patty in a package or container (e.g., a plastic bag) and treating the packaged patty with pressure of at least about 300 MPa (~45,000). Processes for producing simulated egg patties are described in U.S. Pat. Nos. 5,620,735 and 5,665,416, both issued to Manderfeld et al., which are incorporated herein by reference in their entireties.

The processed egg product may include scrambled eggs. For example, scrambled egg may be produced by heating liquid egg material to a temperature of about 75° C. (~170° F.) to about 80° C. (~175° F.) (e.g., heating with steam) and passing the heating egg material through a holding tube (i.e., by extruding the heated egg material). The heated egg material may exit the holding tube through an extrusion plate to produce scrambled eggs. A continuous process for the production of scrambled eggs is described in U.S. patent Publication U.S. 2004/0076733, Sanderson et al., published Apr. 22, 2004 and incorporated herein by reference in its entirety. The scrambled eggs may also be prepared by exposing the egg material to a scraped surface heat exchanger (SSHE). After the scrambled eggs have been prepared, the scrambled eggs may be pressure treated by sealing the scrambled eggs in a package or container (e.g., a plastic bag) and treating the packaged eggs with pressure of at least about 300 MPa (~45,000).

The processed egg product may also include a folded egg patty. The folded egg patty may be produced by cooking liquid egg material to form an egg patty and folding the egg patty after cooking (e.g., into thirds). The folded egg patty may be pressure treated by sealing the patty in a package or container (e.g., a plastic bag) and treating the packaged patty with pressure of at least about 300 MPa (~45,000).

In another embodiment, a packaged processed egg product is produced. The egg product may include liquid egg material (e.g., whole eggs) and/or solid egg material (e.g., a cooked egg patty) contained within a sealed package. The liquid egg material typically has a viscosity of no more than about 5000 cps. The egg material may have been previously pasteurized (e.g., heat-pasteurized).

The packaged processed egg material may include an antimicrobial agent such as about 50 to 1000 ppm nisin. Optionally, the packaged processed egg product may include an acidifying agent such as citric acid.

After the packaged processed egg product has been pressure-treated and stored for at least 15 weeks at about 4° C. (i.e., "the stored product"), the stored product has a total bacterial plate count (TPC) of no more than about 100 microorganisms/gram and maintains acceptable organoleptic properties. In another embodiment, harmful bacteria have been essentially eliminated from the stored product (e.g., the product has no detectable *Listeria* spp. and/or *Salmonella* spp. per gram of product). In a further embodiment, the product is substantially free of *Pseudomonas* spp. (i.e., the product has less than 10 organism/gram *Pseudomonas* spp.).

EXAMPLES

Example 1

Liquid Egg Mixture #1

| INGREDIENTS | PERCENT (w/w) |
| --- | --- |
| Whole Eggs | 99.40–99.80 |
| Sodium Acid Pyrophosphate (SAPP) | 0.10–0.30 |
| Citric Acid | 0.08 |
| Monosodium Phosphate (MSP) | 0.10–0.15 |
| Nisin | 0.005 |
| TOTAL | 100 |
| pH: 6.7 to 6.8 | |
| Solids: 24 ± 1% | |

The ingredients were combined with the whole egg to create a mixture. The pH was taken and additional citric acid was added if necessary to adjust the pH to about 6.7 to 6.8. The whole liquid egg mixture was then heated at about 65° C. (~150° F.) for about 2.5 minutes to pasteurize the mixture. The mixture was then subjected to high pressure processing.

Example 2

Liquid Egg Mixture #2

| INGREDIENTS | PERCENT (w/w) |
| --- | --- |
| Whole Eggs | 60–80 |
| Egg Whites | 5–15 |
| Water | 15–25 |
| Salt | 0.1–1.0 |
| Xanthan Gum | 0.1–0.5 |
| Citric Acid | 0.06 |
| SAPP | 0.05–0.10 |
| Butter Flavor | 0.1 |
| MSP | 0.01–0.05 |
| Nisin | 0.005 |
| TOTAL | 100 |

The ingredients were combined and agitated. Additional citric acid was added to adjust the pH to about 6.7±0.1 if necessary. The liquid egg mixture was then heated at about 65° C. (~150° F.) for about 2.5 minutes to pasteurize the mixture. The mixture was then subjected to high pressure processing.

Example 3

Liquid Egg Mixture #3

| INGREDIENTS | PERCENT (w/w) |
| --- | --- |
| Whole Eggs | 60–80 |
| Egg Whites | 10–20 |
| Water | 5–20 |
| Buttermilk | 0.5–2.0 |
| Salt | 0.1–0.5 |
| Xanthan Gum | 0.1–0.5 |
| Citric Acid | 0.1 |
| Nisin | 0.005 |
| TOTAL | 100 |
| pH 6.7 ± 0.1 | |
| Solids: 19.5–21 | |

The ingredients were combined and agitated. Additional citric acid was added to adjust the pH to about 6.7±0.1 if necessary. The liquid egg mixture was then heated at about 65° C. (~150° F.) for about 2.5 minutes to pasteurize the mixture. The mixture was then subjected to high pressure processing.

Example 4

Scrambled Egg Product

| INGREDIENTS | PERCENT (w/w) |
| --- | --- |
| Whole Eggs | 87.5–97.0 |
| Nonfat Milk | 0.5–2.0 |
| Soybean Oil | 0.5–2.0 |
| Modified Cornstarch | 0.1–1.5 |
| Salt | 0.1–1.5 |
| Black Pepper Flavor | 0.5 |
| Liquid Black Pepper | 0.3 |
| Xanthan Gum | 0.1–0.5 |
| Citric Acid | 0.12 |
| Butter Flavor | 0.06 |
| Sub Total | 96–99 |
| Water from Processing | 1–4 |
| TOTAL | 100 |
| pH 6.6 ± 0.1 | |
| Solids: 26–29 | |

The ingredients were combined and agitated to create a liquid egg mixture. Additional citric acid was added to the mixture to adjust the pH to about 6.6±0.1 if necessary.

The liquid egg mixture, at a temperature of about 4° C. (~40° F.), was pumped by use of a positive displacement pump through a water-jacketed tube in tube pre-heater and brought to a temperature of about 60° C. (~140° F.). The preheated liquid whole egg product was then pumped by means of a positive displacement pump into a scraped surface heat exchanger (SSHE). The dasher contained within the barrel was operated at 270 rpm. Hot water was circulated in the jacket of the SSHE barrel and heat was indirectly transferred to product within the barrel. As the liquid egg product exited the SSHE at a temperature of about 75° C. (~170° F.), it immediately entered one branch of the hold tube. After a period of about 5 minutes, a rotating valve opened to a second 100-foot branch of the holding tube and the product was forced into this section of the holding tube. The proteins within the liquid egg product became denatured and coagulation occurred within the holding tube. For a period of about 5 minutes, the heated liquid egg product was left undisturbed. At the exit of the holding tube, the cooked liquid egg product was forced through an extrusion plate. The egg pieces were then subjected to high pressure processing.

Example 5

Simulated Egg Patty a. Egg White Mixture

| INGREDIENTS | PERCENT (w/w) |
| --- | --- |
| Egg Whites | 97–99 |
| Whey Protein Isolate | 0.5–2.0 |
| Powdered Egg Flavoring | 0.5 |
| Liquid Egg Flavoring | 0.2 |
| EDTA | 0.01–0.05 |

-continued

| INGREDIENTS | PERCENT (w/w) |
|---|---|
| Nisin | 0.02 |
| TOTAL | 100 |
| pH 8.2 | |

The ingredients were combined and agitated to create a liquid egg white mixture.

b. Yolk Centers

| INGREDIENTS | PERCENT (w/w) |
|---|---|
| Yolk | 98–99 |
| Water | 0.1–0.5 |
| SAPP | 0.1–0.5 |
| Citric Acid | 0.1666 |
| EDTA | 0.01–0.05 |
| Nisin | 0.02 |
| TOTAL | 100 |
| pH 5.6–5.8 | |

The SAPP, EDTA, Nisin, and water were added to the yolk. Citric acid was added to adjust the pH to about 5.6–5.8. A yolk mold was filled with the mixture (~16.5 g) and frozen at about −20° C. (~−10° F.) for about three days. The frozen yolk was then added to the liquid egg white (~33 g) in an egg patty form and then cooked with steam at about 98° C. (~210° F.) for about 4.5 minutes. The simulated egg patty was then subjected to high pressure processing.

Example 6

Folded Egg

| INGREDIENTS | PERCENT (w/w) |
|---|---|
| Whole Egg | 95.0–99.0 |
| Soybean Oil | 0.5–2.0 |
| Modified Cornstarch | 0.5–2.0 |
| SAPP | 0.05–0.20 |
| Egg Flavoring | 0.2 |
| Citric Acid | 0.08 |
| Carrageenan Gum | 0.05–0.09 |
| MSP | 0.02–0.05 |
| TOTAL | 100 |
| pH 6.7 ± 0.1 | |

The ingredients were mixed and additional citric acid was added to adjust the pH to about 6.7 if necessary. The mixture was cooked in a mold placed in a heated pan. The pan was heated to a temperature of about 120° C. (~250° F.) to about 150° C. (~300° F.). The mixture was cooked for about one (1) minute, and the cooked patty was folded into thirds. The folded egg was then subjected to high pressure processing.

Example 7

Effect of High Pressure Processing on Shelf Life, Experiment #1

The aforementioned liquid egg products and cooked products (six total, i.e., liquid egg mixture #1, liquid egg mixture #2, liquid egg mixture #3, scrambled egg product, simulated egg patty, and folded egg), were subjected to high pressure processing. As controls, the six egg products were sealed in plastic bags but were not subjected to high pressure processing. In addition to the six egg products, unpasteurized egg whites and unpasteurized egg yolks were also subjected to high pressure processing. Liquid egg mixture #3 was inoculated with $10^6$–$10^7$ *Pseudomonas* spp. as an additional control sample.

To perform high pressure processing, the products were sealed in a plastic bag to create a packaged product, and the packaged product was placed in a pressure chamber. The pressure chamber was filled with an aqueous solution to create a pressure of about 580 MPa (~87,000 psi). The packaged product was pressure-treated for approximately 2.5 minutes.

The packaged products (both pressure-treated and controls) were stored at about 4° C. (~40° F.). At various time points, the packaged products were opened and samples were removed to determine bacterial counts per gram of the egg products.

Example 8

Plate Count Assays

In a first experiment, for the six egg products, bacterial counts were determined initially and at eight (8) weeks, at twenty (20) weeks, and at forty (40) weeks. The bacterial counts were determined in duplicate by total plate counts (TPC) (aerobic plate counts), Psychotrophic bacteria plate counts, and *Pseudomonas* bacteria plate counts.

a. Total (Aerobic) Plate Count

Ingredients: Tryptone (5.0 g/L), yeast extract (2.5 g/L), dextrose (1.0 g/L), agar (9.0 g/L), final pH 7.0±0.2 at 37° C. The ingredients (17.5) were suspended in 1 liter of distilled water. The ingredients were dissolved by bringing the suspension to boiling with frequent stirring. The dissolved mixture was sterilized by autoclaving at 121° C. for 15 minutes and tempered to about 45° C.

Samples were collected in sterile containers using sterile sampling devices and aseptic techniques. A 1:10 dilution of each sample was prepared. Additional appropriate dilutions were prepared from the initial 1:10 dilution by pipetting either 1 ml or 11 ml into a 99 ml or 89 ml dilution blank, respectively, to ensure that at least one plate would have 25 to 250 colonies. Either 1.0 or 0.1 ml portions of these dilutions were pipetted into plates. Approximately 15 mls of melted medium, tempered to 45±1° C., were poured into each plate. The contents of the plates were swirled to mix. After the medium had solidified, the Petri dishes were inverted and incubate at 35±1° C. for 48 hours±3 hours. The number of bacterial colonies were counted and recorded.

b. Psychotrophic Plate Counts

Samples were collected in sterile containers using sterile sampling devices and aseptic technique. A 1:10 dilution of the sample was initially prepared. Additional appropriate dilutions from the 1:10 dilution were prepared by pipetting either 1 ml or 11 ml into a 99 ml or 89 ml dilution blank, respectively, to ensure that at least one plate would have 25 to 250 colonies. Either 1.0 or 0.1 ml portions of these dilutions were pipetted into plates. Approximately 15 mls of melted medium, prepared as described in Example 8a above and tempered to 45±1° C., were poured into each plate. The contents of the plates were swirled to mix. After the medium had solidified, the Petri dishes were inverted and incubated at 21±1° C. for 72±3 hours. The number of bacterial colonies were counted and recorded.

c. *Pseudomonas* Plate Counts

*Pseudomonas* Isolation Agar was obtained from Oxoid, Ltd. Ingredients: *Pseudomonas* Agar Base included gelatin peptone (16.0 g/L), casein hydrosylate (10.0 g/L), potassium sulphate (10.0 g/L), magnesium chloride (1.4 g/L), agar (11.0 g/L) at a pH of 7.1±0.2. The ingredients were suspended in 500 ml of water. Glycerol (5 ml) was added. The suspension was boiled to dissolve the ingredients and sterilized by autoclaving at 121° C. for 15 minutes. The medium was allowed to cool to approximately 50° C. To the cooled medium, cetrimide (5 mg, 10 mg/L), fucidin (5 mg, 10 mg/L) and cephalosporin (25 mg, 50 mg/L) were added. The medium was poured into Petri dishes (plates) and allowed to solidify.

Samples were diluted, and approximately 1 ml were inoculated onto two plates (i.e., approximately 0.5 ml per plate). The inoculum was spread over the surface of the agar using a sterile glass streaking rod. Plates were allowed to sit upright until the inoculum had absorbed into the agar. Plates were then inverted and incubated at 21±1° C. for 72±3 hours. The number of bacterial colonies were counted and recorded.

In addition to determining bacterial plate counts, the organoleptic properties of the egg products were also determined. Appearance and odor were assessed for all samples. If a sample had a bacterial count of less than $10^7$ bacteria/gram and if the sample had an acceptable appearance and odor, the taste of the sample was also assessed.

The results for the six egg products are displayed in Tables 1–6. The results show that the pasteurized, pressure-treated egg products (with the exception of the scrambled egg product) had bacterial counts (TPC, psychotrophs, and *Pseudomonas*) of less than $10^7$/gram and maintained desirable organoleptic properties at twenty (20) weeks. Some products, (Liquid Egg Mixture #1, Simulated Egg Patty, and Folded Egg), had bacterial levels of less than $10^7$/gram and maintained desirable organoleptic properties at forty (40) weeks. In contrast, none of the untreated products maintained desirable organoleptic properties after twenty (20) weeks. Notably, the "commercial shelf life" of the scrambled egg product, the simulated egg patty, and the folded egg product is typically no more than six (6) weeks.

The results for the unpasteurized egg whites and unpasteurized egg yolks are displayed in Tables 7 and 8. At eight (8) weeks, these unpasteurized, pressure-treated products no longer maintained desirable organoleptic properties.

TABLE 1

PRODUCT - LIQUID EGG MIXTURE #1

| Storage Period (4° C.) | TPC | Psych. | *Pseudo.* | Organo. |
|---|---|---|---|---|
| Pressure-Treated | | | | |
| Initial | <10 | <10 | <10 | a |
|  | <10 | <10 | <10 | a |
| 8 weeks | <100 | <100 | <10 | a |
|  | <100 | <100 | <10 | a |
| 20 weeks | $2.00 \times 10^2$ | $5.00 \times 10^2$ | <10 | a |
|  | $3.00 \times 10^2$ | $1.30 \times 10^3$ | <10 | a |
| 40 weeks | <100 | <100 | <10 | a |
|  | $4.00 \times 10^2$ | <100 | <10 | a |
| Untreated | | | | |
| Initial | <10 | <10 | <10 | a |
| 8 weeks | <100 | $5.88 \times 10^6$ | <10 | a |
| 20 weeks | $3.00 \times 10^2$ | $6.00 \times 10^2$ | <10 | u |
| 40 weeks | $6.10 \times 10^3$ | $6.44 \times 10^8$ | <10 | u |

TPC—Total Plate Count (CFU/g)
Psych. - Psychotrophic bacteria (CFU/g)
*Pseudo.* - *Pseudomonas* bacteria (CFU/g)
Organo. - Organoleptic Properties: a = acceptable; u = unacceptable

TABLE 2

PRODUCT - LIQUID EGG MIXTURE #2

| Storage Period (4° C.) | TPC | Psych. | *Pseudo.* | Organo. |
|---|---|---|---|---|
| Pressure-Treated | | | | |
| Initial | <10 | <10 | <10 | a |
|  | <10 | <10 | <10 | a |
| 8 weeks | <100 | <100 | <10 | a |
|  | <100 | <100 | <10 | a |
| 20 weeks | <100 | <100 | <10 | a |
|  | <100 | <100 | <10 | a |
| 40 weeks | $5.60 \times 10^9$ | $3.64 \times 10^8$ | <10 | u |
|  | $1.20 \times 10^3$ | $4.00 \times 10^2$ | $>5.60 \times 10^4$ | u |
| Untreated | | | | |
| Initial | <10 | <10 | <10 | a |
| 8 weeks | <100 | <100 | <10 | a |
| 20 weeks | $3.00 \times 10^2$ | $2.10 \times 10^4$ | <10 | u |
| 40 weeks | $2.00 \times 10^2$ | <100 | <10 | u |

TPC—Total Plate Count (CFU/g)
Psych. - Psychotrophic bacteria (CFU/g)
*Pseudo.* - *Pseudomonas* bacteria (CFU/g)
Organo. - Organoleptic Properties: a = acceptable; u = unacceptable

TABLE 3

PRODUCT - LIQUID EGG MIXTURE #3

| Storage Period (4° C.) | TPC | Psych. | *Pseudo.* | Organo. |
|---|---|---|---|---|
| Pressure-Treated | | | | |
| Initial | <10 | <10 | <10 | a |
| 8 weeks | <100 | <100 | <10 | a |
|  | <100 | <100 | <10 | a |
| 20 weeks | <100 | <100 | <10 | a |
|  | <100 | <100 | <10 | a |
| 40 weeks | $9.00 \times 10^2$ | $1.69 \times 10^8$ | $>5.60 \times 10^4$ | u |
| Untreated | | | | |
| Initial | <10 | <10 | <10 | a |
| 8 weeks | <100 | <100 | <10 | a |
| 20 weeks | $>5.60 \times 10^7$ | $2.17 \times 10^5$ | <10 | u |
| 40 weeks | $1.20 \times 10^3$ | <100 | <10 | u |

TPC—Total Plate Count (CFU/g)
Psych. - Psychotrophic bacteria (CFU/g)
*Pseudo.* - *Pseudomonas* bacteria (CFU/g)
Organo. - Organoleptic Properties: a = acceptable; u = unacceptable

TABLE 4

PRODUCT - SCRAMBLED EGG PRODUCT

| Storage Period (4° C.) | TPC | Psych. | *Pseudo.* | Organo. |
|---|---|---|---|---|
| Pressure-Treated | | | | |
| Initial | <10 | <10 | <10 | a |
|  | <10 | <10 | <10 | a |
| 8 weeks | $6.00 \times 10^2$ | <100 | <10 | a |
|  | $3.70 \times 10^3$ | $6.30 \times 10^4$ | <10 | a |
| 20 weeks | $1.84 \times 10^5$ | $2.61 \times 10^5$ | <10 | u |
|  | $3.60 \times 10^4$ | $2.90 \times 10^4$ | <10 | u |
| 40 weeks | $5.20 \times 10^3$ | <100 | <10 | a |
|  | $2.70 \times 10^4$ | $1.01 \times 10^5$ | <10 | a |
| Untreated | | | | |
| Initial | <10 | <10 | <10 | a |
| 8 weeks | $7.00 \times 10^5$ | $8.96 \times 10^6$ | <10 | a |
| 20 weeks | $9.00 \times 10^6$ | $1.40 \times 10^6$ | <10 | u |
| 40 weeks | $2.31 \times 10^5$ | $4.48 \times 10^6$ | <10 | u |

TPC—Total Plate Count (CFU/g)
Psych. - Psychotrophic bacteria (CFU/g)
*Pseudo.* - *Pseudomonas* bacteria (CFU/g)
Organo. - Organoleptic Properties: a = acceptable; u = unacceptable

TABLE 5

PRODUCT - SIMULATED EGG PATTY

| Storage Period (4° C.) | TPC | Psych. | *Pseudo.* | Organo. |
|---|---|---|---|---|
| Pressure-Treated | | | | |
| Initial | <10 | <10 | <10 | a |
|  | <10 | <10 | <10 | a |
| 8 weeks | <100 | <100 | <10 | a |
|  | $2.00 \times 10^2$ | <100 | <10 | a |
| 20 weeks | $4.00 \times 10^2$ | <100 | <10 | a |
|  | <100 | $9.00 \times 10^2$ | <10 | a |
| 40 weeks | $3.70 \times 10^3$ | <100 | <10 | a |
|  | $1.80 \times 10^3$ | <100 | <10 | a |
| Untreated | | | | |
| Initial | $1.40 \times 10^2$ | <10 | <10 | a |
| 8 weeks | <100 | <100 | <10 | a |
| 20 weeks | $1.10 \times 10^6$ | $1.70 \times 10^6$ | $>5.60 \times 10^2$ | u |
| 40 weeks | $2.10 \times 10^3$ | <100 | <10 | u |

TPC—Total Plate Count (CFU/g)
Psych. - Psychrotrophic bacteria (CFU/g)
*Pseudo.* - *Pseudomonas* bacteria (CFU/g)
Organo. - Organoleptic Properties: a = acceptable; u = unacceptable

TABLE 6

PRODUCT - FOLDED EGG

| Storage Period (4° C.) | TPC | Psych. | *Pseudo.* | Organo. |
|---|---|---|---|---|
| Pressure-Treated | | | | |
| Initial | <10 | <10 | <10 | a |
|  | <10 | <10 | <10 | a |
| 8 weeks | $3.00 \times 10^2$ | <100 | <10 | a |
|  | <100 | <100 | <10 | a |
| 20 weeks | $1.50 \times 10^4$ | $8.00 \times 10^2$ | <10 | a |
|  | $3.90 \times 10^3$ | $5.00 \times 10^2$ | <10 | a |
| 40 weeks | <100 | <100 | <10 | a |
|  | $3.00 \times 10^2$ | <100 | <10 | a |
| Untreated | | | | |
| Initial | <10 | <10 | <10 | a |
| 8 weeks | $2.00 \times 10^2$ | <100 | <10 | a |
| 20 weeks | $3.00 \times 10^2$ | $4.00 \times 10^2$ | <10 | u |
| 40 weeks | $7.00 \times 10^2$ | $6.72 \times 10^4$ | <10 | u |

TPC—Total Plate Count (CFU/g)
Psych. - Psychrotrophic bacteria (CFU/g)
*Pseudo.* - *Pseudomonas* bacteria (CFU/g)
Organo. - Organoleptic Properties: a = acceptable; u = unacceptable

TABLE 7

PRODUCT - UNPASTEURIZED EGG WHITES

| Storage Period (4° C.) | TPC | Psych. | *Pseudo.* | Organo. |
|---|---|---|---|---|
| Pressure-Treated | | | | |
| Initial | $6.16 \times 10^4$ | $8.54 \times 10^5$ | <10 | a |
|  | $1.01 \times 10^4$ | $1.62 \times 10^6$ | <10 | a |
| 8 weeks | $>5.60 \times 10^7$ | $>5.60 \times 10^6$ | $>5.60 \times 10^6$ | a |
|  | $1.80 \times 10^5$ | $>5.60 \times 10^6$ | $>5.60 \times 10^6$ | a |
| 20 weeks | $3.57 \times 10^7$ | $2.87 \times 10^7$ | 80 | u |
|  | $3.71 \times 10^7$ | $3.46 \times 10^7$ | 90 | u |
| 40 weeks | $1.67 \times 10^8$ | $3.64 \times 10^8$ | $8.80 \times 10^6$ | u |
|  | $1.70 \times 10^6$ | $3.10 \times 10^7$ | $3.60 \times 10^6$ | u |

TABLE 7-continued

PRODUCT - UNPASTEURIZED EGG WHITES

| Storage Period (4° C.) | TPC | Psych. | *Pseudo.* | Organo. |
|---|---|---|---|---|
| Untreated | | | | |
| Initial | $>5.60 \times 10^6$ | $1.26 \times 10^8$ | $1.20 \times 10^5$ | a |
| 8 weeks | $>5.60 \times 10^7$ | $3.50 \times 10^8$ | $>5.60 \times 10^6$ | u |
| 20 weeks | $3.91 \times 10^7$ | $2.91 \times 10^7$ | $1.10 \times 10^2$ | u |
| 40 weeks | $1.13 \times 10^7$ | $1.55 \times 10^8$ | $3.20 \times 10^3$ | u |

TPC—Total Plate Count (CFU/g)
Psych. - Psychrotrophic bacteria (CFU/g)
*Pseudo.* - *Pseudomonas* bacteria (CFU/g)
Organo. - Organoleptic Properties: a = acceptable; u = unacceptable

TABLE 8

PRODUCT - UNPASTEURIZED EGG YOLKS

| Storage Period (4° C.) | TPC | Psych. | *Pseudo.* | Organo. |
|---|---|---|---|---|
| Pressure-Treated | | | | |
| Initial | 90 | $4.20 \times 10^3$ | <10 | a |
|  | $2.40 \times 10^2$ | $5.00 \times 10^2$ | <10 | a |
| 8 weeks | $3.23 \times 10^7$ | $1.57 \times 10^7$ | $>5.60 \times 10^6$ | a |
|  | $9.10 \times 10^5$ | $1.12 \times 10^7$ | $>5.60 \times 10^6$ | a |
| 20 weeks | $3.37 \times 10^7$ | $2.71 \times 10^7$ | 70 | u |
|  | $1.52 \times 10^7$ | $4.31 \times 10^7$ | 80 | u |
| 40 weeks | $1.70 \times 10^8$ | $5.32 \times 10^8$ | $3.92 \times 10^7$ | u |
|  | $2.40 \times 10^8$ | $5.88 \times 10^8$ | $3.08 \times 10^7$ | u |
| Untreated | | | | |
| Initial | $>5.60 \times 10^6$ | $7.84 \times 10^6$ | $>5.60 \times 10^6$ | a |
| 8 weeks | $1.93 \times 10^7$ | $5.88 \times 10^8$ | $>5.60 \times 10^6$ | u |
| 20 weeks | $1.26 \times 10^7$ | $1.27 \times 10^7$ | 90 | u |
| 40 weeks | $2.20 \times 10^8$ | $2.50 \times 10^9$ | $5.60 \times 10^7$ | u |

TPC—Total Plate Count (CFU/g)
Psych. - Psychrotrophic bacteria (CFU/g)
*Pseudo.* - *Pseudomonas* bacteria (CFU/g)
Organo. - Organoleptic Properties: a = acceptable; u = unacceptable Example 9

Effect of High Pressure Processing on Shelf Life, Experiment #2

In a second experiment, samples from pressure-treated cooked products were tested, including scrambled egg product with nisin, folded egg product with nisin, folded egg product without nisin, and simulated egg patty with nisin. The bacterial counts were determined initially and at four (4) weeks, at eight (8) weeks, at twelve (12) weeks, at sixteen (16) weeks, twenty (20) weeks, and twenty-four (24) weeks. The results are displayed in Tables 9–12. All the cooked products had bacteria counts of less than 20/gram (TPC, psychrotrophs, and *Pseudomonas*) and maintained desirable organoleptic properties up to at least twenty (20) weeks.

TABLE 9

PRODUCT - SCRAMBLED EGG PRODUCT WITH NISIN

| Storage Period (4° C.) | TPC | Psych. | *Pseudo.* | Organo. |
|---|---|---|---|---|
| *Pressure-Treated* | | | | |
| Initial |  | <10 | <10 | a |
| 4 weeks | <10 | <10 | <10 | a |
|  | <10 | <10 | <10 | a |
| 8 weeks | <10 | <10 | <10 | a |
|  | <10 | <10 | <10 | a |
| 12 weeks | <10 | <10 | <10 | a |
|  | <10 | <10 | <10 | a |
| 16 weeks | <10 | <10 | <10 | a |
|  | <10 | 10 | <10 | a |
| 20 weeks | <10 | <10 | <10 | a |
|  | <10 | <10 | <10 | a |
| 24 weeks | <10 | <10 | <10 | a |
|  | <10 | <10 | <10 | a |
| *Untreated* | | | | |
| Initial |  | <10 | <10 | a |

TPC—Total Plate Count (CFU/g)
Psych. - Psychotrophic bacteria (CFU/g)
*Pseudo.* - *Pseudomonas* bacteria (CFU/g)
Organo. - Organoleptic Properties: a = acceptable

TABLE 10

PRODUCT - FOLDED EGG PRODUCT WITH NISIN

| Storage Period (4° C.) | TPC | Psych. | *Pseudo.* | Organo. |
|---|---|---|---|---|
| *Pressure-Treated* | | | | |
| Initial |  | <10 | <10 | a |
| 4 weeks | <10 | <10 | <10 | a |
|  | <10 | <10 | <10 | a |
| 8 weeks | <10 | <10 | <10 | a |
|  | <10 | <10 | <10 | a |
| 12 weeks | <10 | <10 | <10 | a |
|  | <10 | <10 | <10 | a |
| 16 weeks | <10 | <10 | <10 | a |
|  | <10 | <10 | <10 | a |
| 20 weeks | <10 | <10 | <10 | a |
|  | <10 | <10 | <10 | a |
| 24 weeks | <10 | <10 | <10 | u |
|  | <10 | <10 | <10 | u |
| *Untreated* | | | | |
| Initial |  | <10 | <10 | a |

TPC—Total Plate Count (CFU/g)
Psych. - Psychotrophic bacteria (CFU/g)
*Pseudo.* - *Pseudomonas* bacteria (CFU/g)
Organo. - Organoleptic Properties: a = acceptable; u = unacceptable

TABLE 11

PRODUCT - FOLDED EGG PRODUCT WITHOUT NISIN

| Storage Period (4° C.) | TPC | Psych. | *Pseudo.* | Organo. |
|---|---|---|---|---|
| *Pressure-Treated* | | | | |
| Initial |  | <10 | <10 | a |
| 4 weeks |  |  |  |  |
| 8 weeks | <10 | <10 | <10 | a |
|  | <10 | <10 | <10 | a |
| 12 weeks | <10 | <10 | <10 | a |
|  | 20 | <10 | <10 | a |
| 16 weeks | <10 | <10 | <10 | a |
|  | 10 | <10 | <10 | a |
| 20 weeks | <10 | <10 | <10 | a |
|  | <10 | <10 | <10 | a |
| 24 weeks | <10 | <10 | <10 | u |
|  | <10 | <10 | <10 | u |
| *Untreated* | | | | |
| Initial |  | <10 | <10 | a |

TPC—Total Plate Count (CFU/g)
Psych. - Psychotrophic bacteria (CFU/g)
*Pseudo.* - *Pseudomonas* bacteria (CFU/g)
Organo. - Organoleptic Properties: a = acceptable; unacceptable

TABLE 12

PRODUCT - SIMULATED EGG PATTY WITH NISIN

| Storage Period (4° C.) | TPC | Psych. | *Pseudo.* | Organo. |
|---|---|---|---|---|
| *Pressure-Treated* | | | | |
| Initial |  | <10 | <10 | a |
| 4 weeks | <10 | <10 | <10 | a |
|  | <10 | <10 | <10 | a |
| 8 weeks | <10 | <10 | <10 | a |
|  | <10 | <10 | <10 | a |
| 12 weeks | <10 | <10 | <10 | a |
|  | <10 | <10 | <10 | a |
| 16 weeks | <10 | <10 | <10 | a |
|  | <10 | <10 | <10 | a |
| 20 weeks | <10 | <10 | <10 | a |
|  | <10 | <10 | <10 | a |
| 24 weeks | <10 | <10 | <10 | a |
|  | <10 | <10 | <10 | a |
| *Untreated* | | | | |
| Initial |  | <10 | <10 | a |

TPC—Total Plate Count (CFU/g)
Psych.—Psychotrophic bacteria (CFU/g)
*Pseudo.*—*Pseudomonas* bacteria (CFU/g)
Organo.—Organoleptic Properties: a = acceptable All references, patents, and/or applications cited in the specification are indicative of the level of skill of those skilled in the art to which the invention pertains, and are incorporated by reference in their entireties, including any tables and figures, to the same extent as if each reference had been incorporated by reference in its entirety individually.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any 2 different values as the endpoints of a range. Such ranges are also within the scope of the described invention.

What is claimed is:

1. A method for producing a processed egg material comprising treating cooked egg material with pressure of about 300–600 MPa at a temperature of about 4–65° C., wherein the cooked egg material comprises a food grade antimicrobial agent.

2. The method of claim 1, wherein the pressure-treating step comprises pressure-treating the cooked egg material in a sealed package.

3. The method of claim 2, wherein the cooked egg material in the sealed package is pressure-treated with hydrostatic pressure.

4. The method of claim 1, wherein the food grade antimicrobial agent comprises nisin.

5. The method of claim 1, wherein the cooked egg material further comprises an acidifying agent.

6. The method of claim 4, wherein the cooked egg material comprises about 50 to 1000 ppm nisin.

7. The method of claim 1, wherein the cooked egg material is pressure-treated for about 1 to about 5 minutes.

8. The method of claim 1, wherein the cooked egg material has a pH of about 5.5 to about 6.9.

9. The method of claim 1, wherein the cooked egg material comprises whole egg material.

10. The method of claim 1, wherein the cooked egg material comprises egg yolk material.

11. The method of claim 1, wherein the cooked egg material comprises egg white material.

12. The method of claim 1, wherein the cooked egg material is scrambled egg material.

13. The method of claim 2, wherein the sealed package has a head space of no more than about 15 vol. %.

14. The method of claim 1, wherein the processed egg product is capable of being stored for at least 15 weeks at 4° C. to provide a stored product, such that the stored product retains acceptable organoleptic properties and has a total bacterial plate count of no more than about 100 bacteria per gram product.

15. The method of claim 14, wherein the stored product has a psychotrophic microorganism plate count of no more than about 100 bacteria per gram product.

16. The method of claim 14, wherein the stored product has a *Pseudomonas* ssp. plate count of no more than about 10 bacteria per gram product.

17. A method for producing a processed egg material comprising:
   (a) preparing scrambled egg material; and
   (b) treating the scrambled egg material with pressure of about 300–600 MPa at a temperature of about 4–65° C.

18. The method of claim 17, wherein the scrambled egg material is prepared by a method comprising:
   (a) heating liquid egg material to a temperature effective for cooking an egg; and
   (b) passing the heated egg material through a holding tube and an extrusion plate.

19. The method of claim 17, wherein the processed egg product is capable of being stored for at least 15 weeks at 4° C. to provide a stored product, such that the stored product retains acceptable organoleptic properties and has a total bacterial plate count of no more than about 100 bacteria per gram product.

20. The method of claim 19, wherein the stored product has a psychotrophic microorganism plate count of no more than about 100 bacteria per gram product.

21. The method of claim 19, wherein the stored product has a *Pseudomonas* ssp. plate count of no more than about 10 bacteria per gram product.

22. The method of claim 19, wherein the processed egg material comprises a food grade antimicrobial agent.

23. A method for producing a processed egg material comprising:
   (a) preparing cooked egg material by:
      (i) freezing egg yolk material;
      (ii) combining the frozen egg yolk material and liquid egg white material to provide a combined egg material; and
      (iii) cooking the combined egg material;
   (b) treating the cooked egg material with pressure of about 300–600 MPa at a temperature of about 4–65° C.

24. The method of claim 23, wherein the processed egg product is capable of being stored for at least 15 weeks at 4° C. to provide a stored product, such that the stored product retains acceptable organoleptic properties and has a total bacterial plate count of no more than about 100 bacteria per gram product.

25. The method of claim 24, wherein the stored product has a psychotrophic microorganism plate count of no more than about 100 bacteria per gram product.

26. The method of claim 24, wherein the stored product has a *Pseudomonas* ssp. plate count of no more than about 10 bacteria per gram product.

27. The method of claim 24, wherein the processed egg material comprises a food grade antimicrobial agent.

* * * * *